US008719526B2

(12) United States Patent
Chen et al.

(10) Patent No.: US 8,719,526 B2
(45) Date of Patent: May 6, 2014

(54) SYSTEM AND METHOD FOR PARTITIONING MULTIPLE LOGICAL MEMORY REGIONS WITH ACCESS CONTROL BY A CENTRAL CONTROL AGENT

(75) Inventors: Iue-Shuenn I. Chen, San Diego, CA (US); Brian F. Schoner, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 2125 days.

(21) Appl. No.: 11/325,730

(22) Filed: Jan. 5, 2006

(65) Prior Publication Data

US 2007/0156987 A1   Jul. 5, 2007

(51) Int. Cl.
*G06F 12/00*   (2006.01)
*G06F 13/00*   (2006.01)

(52) U.S. Cl.
USPC ............ 711/163; 711/100; 711/154; 711/170

(58) Field of Classification Search
USPC .......... 711/100, 147, 170, 103, 150–154, 163
See application file for complete search history.

(56) References Cited

U.S. PATENT DOCUMENTS

| 3,978,478 | A  | * | 8/1976  | Schmitz ......................... 340/521 |
| 5,047,982 | A  | * | 9/1991  | Smith et al. .............. 365/185.01 |
| 5,987,611 | A  | * | 11/1999 | Freund ............................. 726/4 |
| 6,275,951 | B1 | * | 8/2001  | Park ............................. 713/500 |
| 6,449,699 | B2 | * | 9/2002  | Franke et al. ................. 711/147 |
| 6,587,937 | B1 | * | 7/2003  | Jensen et al. ................. 711/173 |
| 6,976,136 | B2 | * | 12/2005 | Falik et al. .................... 711/152 |
| 7,013,365 | B2 | * | 3/2006  | Arnouse ....................... 711/115 |
| 2004/0255081 | A1 | * | 12/2004 | Arnouse ....................... 711/115 |
| 2005/0044403 | A1 | * | 2/2005  | Kim ............................. 713/200 |
| 2005/0066354 | A1 | * | 3/2005  | Dellow et al. .................. 725/30 |
| 2005/0252963 | A1 | * | 11/2005 | Adams et al. ................. 235/382 |
| 2006/0129747 | A1 | * | 6/2006  | Weber et al. .................. 711/100 |
| 2007/0011419 | A1 | * | 1/2007  | Conti ............................ 711/163 |

* cited by examiner

Primary Examiner — Tuan Thai
(74) *Attorney, Agent, or Firm* — Foley & Lardner LLP (57) ABSTRACT

A method for securely handling processing of information may include controlling from within a chip, access to at least one portion of an on-chip memory by a plurality of on-chip clients that have pre-determined access to the at least one portion of the on-chip memory. The pre-determined access may be governed by pre-determined access rules that are hard-coded within the chip. At least one of the plurality of on-chip clients may access at least a portion of the on-chip memory. The on-chip memory may be accessible by at least another one of the plurality of on-chip clients. The pre-determined access rules may comprise at least one address range within the on-chip memory corresponding to at least one of the plurality of on-chip clients.

28 Claims, 5 Drawing Sheets

SYSTEM AND METHOD FOR PARTITIONING MULTIPLE LOGICAL MEMORY REGIONS WITH ACCESS CONTROL BY A CENTRAL CONTROL AGENT

RELATED APPLICATIONS

This application makes reference to U.S. patent application Ser. No. 11/326,065, filed Jan. 5, 2006, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to securely handling processing of information. More specifically, certain embodiments of the invention relate to a system and method for partitioning multiple logical memory regions with access control by a central control agent.

BACKGROUND OF THE INVENTION

In many data processing applications, it may be required that certain data stored in one or more memory regions be continuously, or periodically, monitored and analyzed by a particular client to ensure the integrity of the data in these regions of memory. A secure protocol may be utilized to ensure that the content stored in memory is not changed, replaced, or in any way tampered with, by piracy attempts and/or unauthorized users.

With regard to robust protection of data against tampering, information bearing signals should be protected so as to eliminate unauthorized interception and access by a third party. Some conventional signal security methods utilize signal scrambling where the scrambled signal content is not readily discernable by a receiving party. Efficient scrambling of different kinds of signals such as multimedia broadcasts, for example, may be achieved in such a manner that there is no perceptible deterioration in signal quality when these signals are being restored. With either a conditional access (CA) system or a copy protection system, private or secure keys may be utilized for scrambling and/or descrambling high-value content or for protecting highly sensitive transactions. In a CA system, a content scrambling key is utilized and this content scrambling key has to be protected.

For a complex computer or a System on Chip (SoC) integrated circuit solution, there may be many clients in the SoC that access the memory for fetching instructions and/or data, for example. Such clients within the SoC may be adapted to access the memory through a memory bus. An unauthorized user may attempt to tap into the memory bus from outside of the SoC in order to monitor the data access patterns of the SoC clients and to attempt an unauthorized signal access. Furthermore, a plurality of clients that are external or internal to the SoC may attempt an unauthorized access to one or more regions of on-chip memory. In addition, the plurality of clients may also attempt to access, and execute without permission, one or more instructions stored in the on-chip memory. Since each of the clients may utilize a separate control mechanism for accessing the on-chip memory, it may be difficult to monitor memory access by the plurality of clients and prevent unauthorized attempts by one or more of the plurality of clients to read and/or write to the on-chip memory.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for partitioning multiple logical memory regions with access control by a central control agent, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for partitioning multiple logical memory regions, with access control by a central control agent within a multiple memory client system. The multiple memory client system may be implemented within a single chip. In an exemplary aspect of the invention, on-chip memory may be partitioned into a plurality of regions. Unauthorized data access by memory clients to one or more of the memory regions may be prevented by utilizing a single client manager. The client manager may be adapted to monitor and manage read and/or write access to the regions of the on-chip memory. The client manager may be utilized to manage access by a plurality of memory clients, thereby preventing the need for a separate monitoring agent for each client. Furthermore, the client manager may utilize a security policy for allowing secure access to a memory region that stores data. The client manager may also utilize a security policy for allowing secure access to an instruction region in the on-chip memory. The security policy may be hard-coded within the chip.

Figure 1:
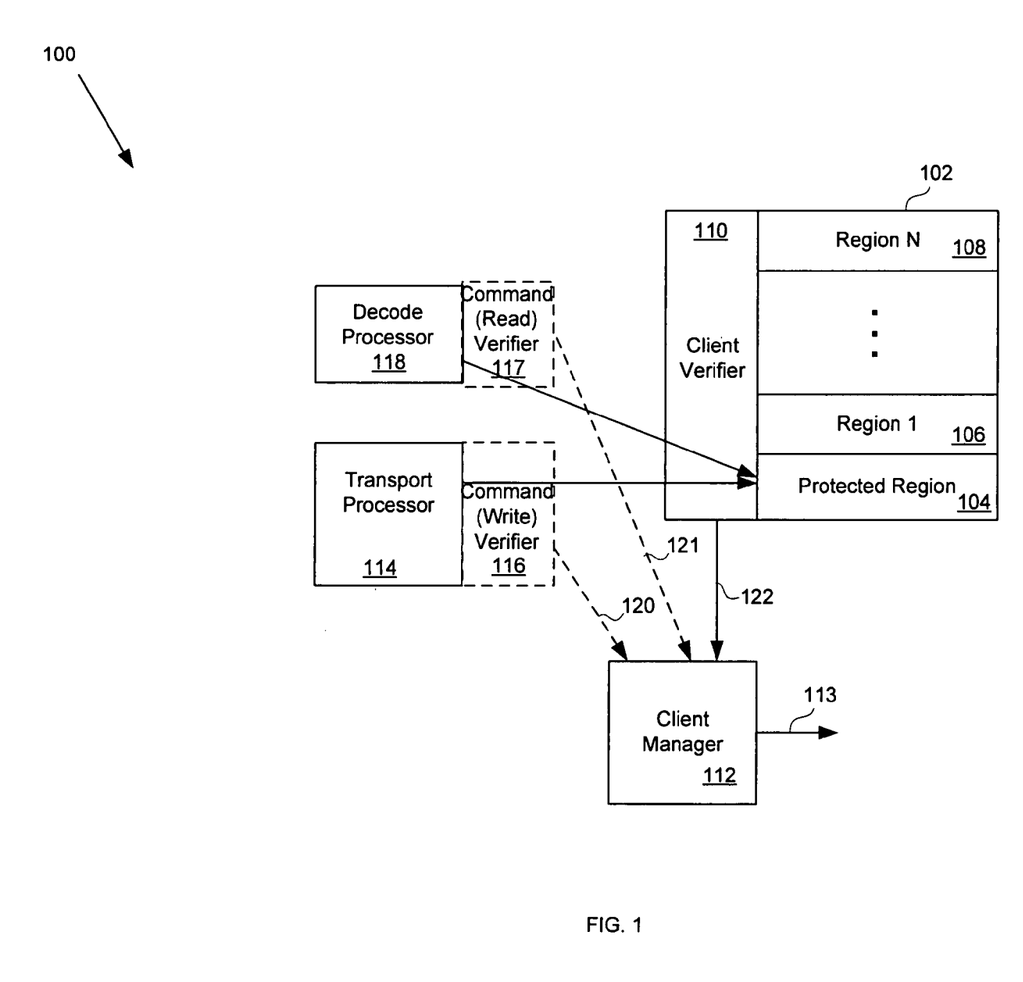
FIG. 1 is a block diagram illustrating an exemplary system for securely accessing a protected region of on-chip memory, in accordance with an embodiment of the invention.

FIG. 1 is a block diagram illustrating an exemplary system for securely accessing a protected region of on-chip memory, in accordance with an embodiment of the invention. Referring to FIG. 1, the system 100 may comprise memory 102, a transport processor 114, a decode processor 118, a client verifier 110, command verifiers 116 and 117, and client manager 112.

In one embodiment of the invention, the system 100 may be implemented as a system-on-a-chip (SoC) integrated circuit solution comprising multiple CPUs, or memory clients, for example. The memory 102 may comprise on-chip memory, for example. Furthermore, the memory 102 may be partitioned into a plurality of regions, region 1 106, . . . , region N 108. The memory 102 may also comprise a protected region 104. The protected region 104 may be utilized for storing protected data, such as demultiplexed audio and/or video bitstream data, for example. Each memory client within the system 100 may have access to a determined number of the N memory regions, and data may be communicated within the system 100 in a defined and controlled manner.

The client verifier 110 may comprise suitable circuitry, logic, and/or code and may be adapted to receive one or more requests from memory clients for accessing one or more of the memory regions within the on-chip memory 102. In this regard, the client verifier 102 may receive client identification (ID) information from a memory client and a request to access a memory region within the on-chip memory 102. The client verifier 110 may verify whether the requested memory access is permitted utilizing pre-determined access rules. A memory client may comprise a CPU or another processor that may be adapted to access the on-chip memory 102.

The command verifiers 116 and 117 may comprise suitable circuitry, logic, and/or code and may be adapted to verify access by one or more memory clients to an instruction region in the on-chip memory 102 for executing an instruction. For example, the read verifier 117 may be adapted to verify access by the decode processor 118 to an instruction region within the on-chip memory 102 for execution of a read instruction. Similarly, the write verifier 116 may be adapted to verify access by the transport processor 114 to an instruction region within the on-chip memory 102 for execution of a write instruction.

The transport processor 114 may comprise suitable circuitry, logic, and/or code and may be adapted to parse and demultiplex a transport bitstream. For example, the transport processor 114 may parse and demultiplex a received transport bitstream into an audio elementary stream and a video elementary stream. The decode processor 118 may comprise suitable circuitry, logic, and/or code and may be adapted to decode an elementary audio or video stream.

The client manager 112 may comprise suitable circuitry, logic, and/or code and may be adapted to determine and store access rules for accessing a data region or an instruction region within the on-chip memory 102. In addition, the client manager may communicate with one or more of the client verifiers or command verifiers within the system 100 and perform a remedial action if the verifiers detect an unauthorized memory access attempt. The access rules may be defined ahead of time and may be built into the client manager 112 or into another chip within the system 100. In this regard, the access rules may not be changed.

In operation, the transport processor 114 may receive transport bitstream. The transport processor 114 may then demultiplex and parse the received transport bitstream to generate an audio elementary stream and a video elementary stream, for example. The elementary streams may then be communicated and stored within the protected region 104 of the on-chip memory 102. Prior to storing the elementary data streams into the protected region 104, the write verifier 116 may verify that the transport processor 114 may execute a "write" instruction into the on-chip memory 102. In this regard, the write verifier may receive a device ID from the transport processor 114. The write verifier 116 may then verify whether the transport processor 114 may be allowed to execute a "write" instruction into the on-chip memory 102, based on pre-determined access rules. The access rules may be determined by the client manager 112 and may be hard-coded within the client manager 112.

After the write verifier verifies that the transport processor 114 may execute a "write" instruction into the on-chip memory 102, client ID information of the transport processor 114 and an address range of the protected region 104 may be communicated to the client verifier 110. The client verifier 110 may verify whether the transport processor 114 may access the protected region 104, based on the pre-determined access rules that may be hard-coded within the client manager 112. After the client verifier 110 verifies that the transport processor 114 may access the protected region 104, the transport processor 114 may execute a "write" instruction within the on-chip memory 102 and store the elementary stream data into the protected region 104.

Similarly, the read verifier 117 may verify that the decode processor 118 may execute a "read" instruction within the on-chip memory 102. After the read verifier 117 verifies that the decode processor 118 may execute a "read" instruction within the on-chip memory 102, the client verifier 110 may verify whether the decode processor 118 may access the protected region 104, based on the pre-determined access rules that may be hard-coded within the client manager 112, for example. After the client verifier 110 verifies that the decode processor 118 may access the protected region 104, the decode processor 118 may execute a "read" instruction within the on-chip memory 102 and read the elementary stream data stored in the protected region 104.

In an exemplary embodiment of the invention, if any of the verifier blocks 110, 116 or 117 within the system 100 detect an unauthorized attempt to execute an instruction within the on-chip memory 102 or to access a region within the on-chip memory 102, the verifier blocks 110, 116 or 117 may communicate interrupts 122, 120 and 121, respectively, to the client manager 112. The client manager 112 may then generate one or more commands 113 and perform a remedial action. For example, the client manager 112 may disable the violating memory client, disable the on-chip memory 102, disable the entire system 100, and/or re-initialize the on-chip memory 102.

Even though two memory clients, the processors 114 and 118, and three verifier blocks 110, 116 and 117 are disclosed and illustrated in FIG. 1, the present invention may not be so limited. In this regard, the system 100 may comprise more than two memory clients and each memory client may utilize a client verifier and/or a command verifier with the above-described functionalities.

Figure 2:
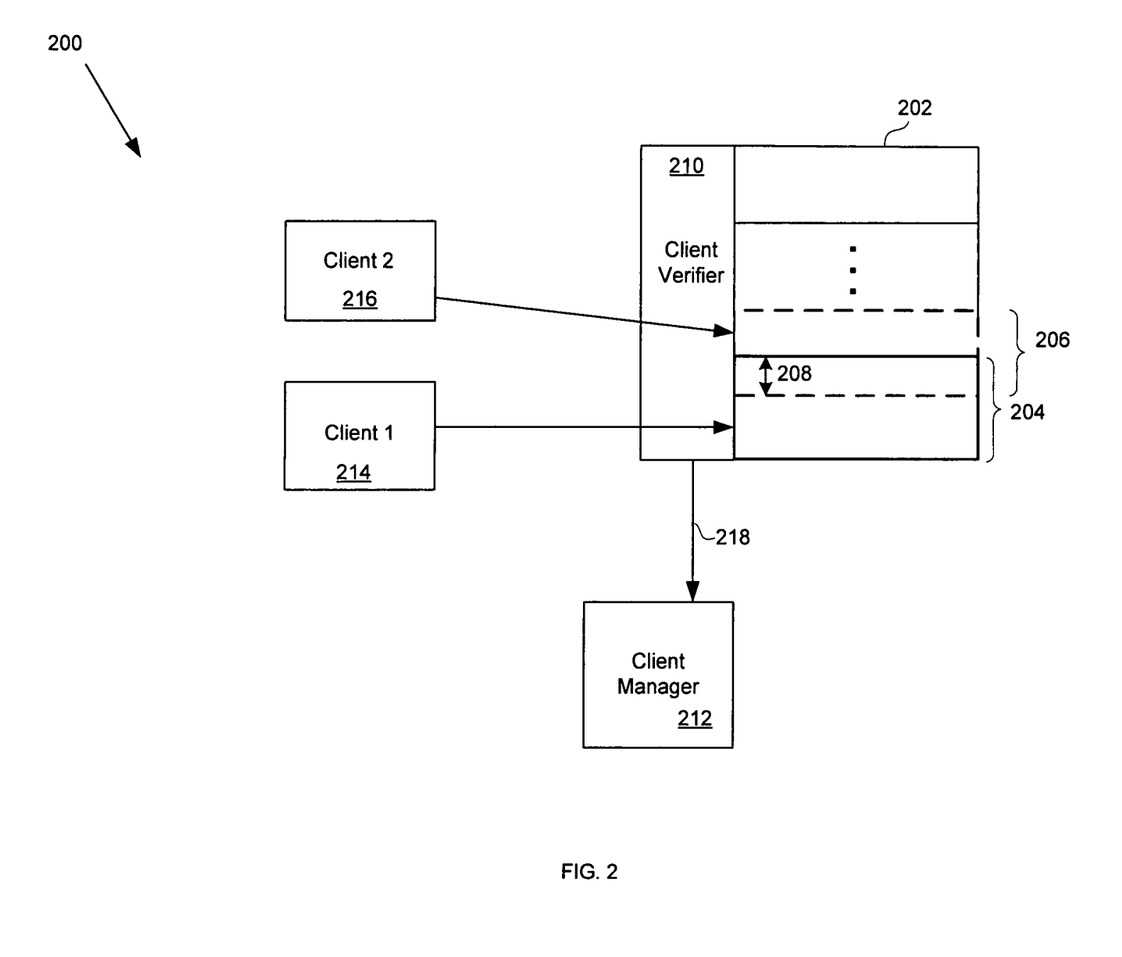
FIG. 2 is a block diagram illustrating an exemplary system for securely accessing on-chip memory by a plurality of clients, in accordance with an embodiment of the invention.

FIG. 2 is a block diagram illustrating an exemplary system for securely accessing on-chip memory by a plurality of clients, in accordance with an embodiment of the invention. Referring to FIG. 2, the system 200 may comprise memory 202, a first memory client 214, a second memory client 216, a client verifier 210, and a client manager 212.

The memory 202 may comprise on-chip memory, for example, and may be partitioned into a plurality of regions, such as regions 204 and 206. In one embodiment of the invention, memory regions 204 and 206 may overlap. In this regard, if client 214 has access to memory region 204 and client 216 has access to memory region 206, then both clients 214 and 216 may have access to the overlapping region 208 within the on-chip memory 202. The client verifier 210 and the client manager 212 may comprise suitable circuitry, logic, and/or code and may provide the same functionalities as the client verifier 110 and the client manager 112 described with regard to FIG. 1.

In operation, client ID information for the memory client 214 and an address range of the memory region 204 may be communicated to the client verifier 210. In one embodiment of the invention, the client manager 212 may communicate the predetermined access rules to one or more of the verifier blocks within the system 200. In this regard, the client verifier 210 may verify whether the memory client 214 may access the memory region 204, based on pre-determined access rules that may be hard-coded within the client manager 212 and communicated to the client verifier 210. Similarly, client ID information of the memory client 216 and an address range of the memory region 206 may be communicated to the client verifier 210. The client verifier 210 may then verify whether the memory client 216 may access the memory region 206, based on the pre-determined access rules that may be hard-coded within the client manager 212 and communicated to the client verifier 210.

In an exemplary embodiment of the invention, if the client verifier 210 within the system 100 detects an unauthorized attempt by memory client 214 or memory client 216 to access a region within the on-chip memory 102, which violates a pre-determined access rule, the client verifier 210 may communicate an interrupt 218 to the client manager 212. In response to the interrupt 218, the client manager 212 may perform a remedial action. For example, the client manager may disable the violating memory client, disable the on-chip memory 202, disable the entire system 200, and/or re-initialize one or more regions within the on-chip memory 202.

Figure 3:
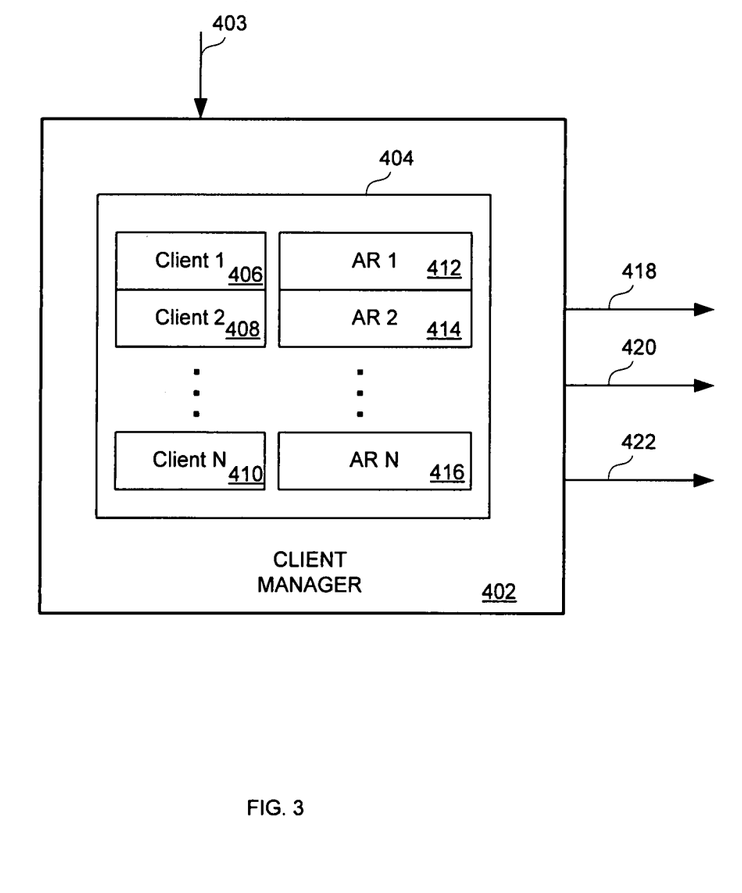
FIG. 3 is a block diagram of an exemplary client manager with a security policy for, for example, accessing a memory region, in accordance with an embodiment of the invention.

FIG. 3 is a block diagram of an exemplary client manager with a security policy for, for example, accessing a memory region, in accordance with an embodiment of the invention. Referring to FIG. 3, the client manager 402 may comprise suitable circuitry, logic, and/or code and may be adapted to determine and store access rules 404 for accessing a plurality of data regions within an on-chip memory, such as the on-chip memory 102 in FIG. 1. The access rules 404 may comprise a list of the memory clients that may be managed by the client manager 402. For example, the memory access rules 404 may comprise a list of N memory clients 406, ..., 410. Furthermore, the memory access rules 404 may comprise a list of address regions (AR) 412, ..., 416, corresponding to the N memory clients 406, ..., 410. Each address region may define a data region partition within an on-chip memory that may be accessed by a corresponding memory client entry.

For example, memory client entry 408 may comprise memory client 2. Address region entry 414 may comprise one or more data regions partitioned within an on-chip memory, which may be accessed by memory client 2. One or more memory region partitions corresponding to different memory clients may be overlapping. The client manager 402 may communicate with one or more client verifiers or command verifiers and perform a remedial action if one or more of the verifiers detect an unauthorized memory access attempt to a data region of the on-chip memory. In this regard, if a verifier detects an unauthorized memory access attempt to a data region, the verifier may communicate an interrupt 403 to the client manager 402. In response to the interrupt 403, the client manager 402 may generate instructions 418, 420, and/or 422. The client manager 402 may then perform a remedial action based on one or more of the generated instructions.

In one embodiment of the invention, the instruction 418 may be utilized to disable a violating memory client and/or to disable the on-chip that a violating memory client may be trying to access. In another embodiment of the invention, the instruction 420 may be utilized to disable a multiple client system utilizing the client manager 402. In yet another embodiment of the invention, the instruction 422 may be utilized to re-initialize one or more regions within an on-chip memory, to which a violating memory client has attempted access.

Figure 4:
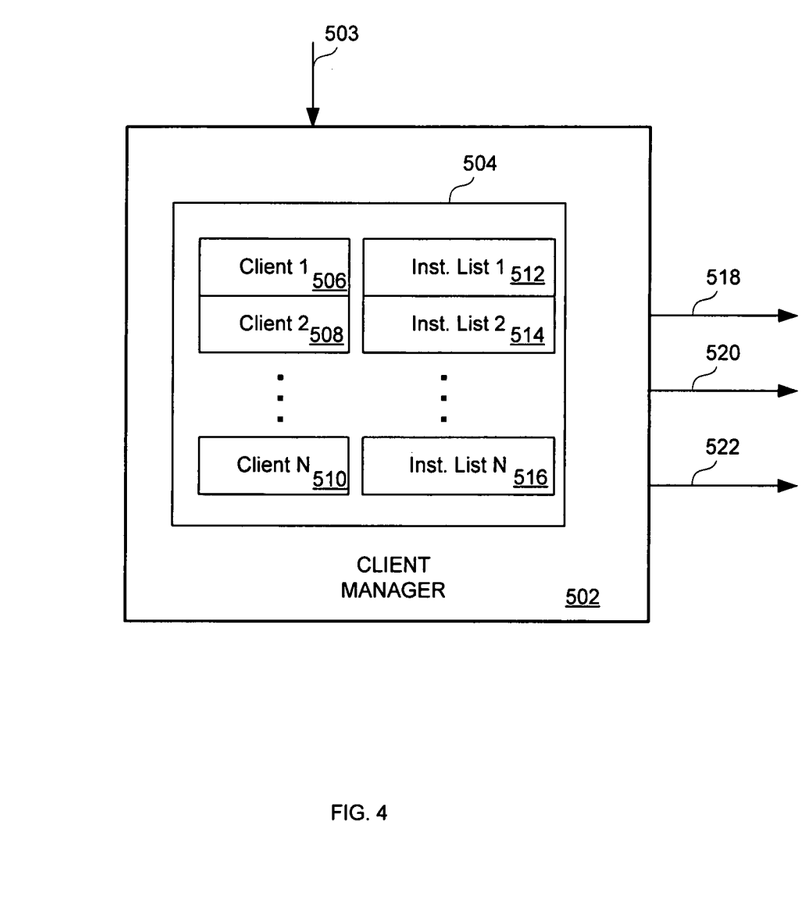
FIG. 4 is a block diagram of an exemplary client manager with a security policy for, for example, executing a plurality of instructions, in accordance with an embodiment of the invention.

FIG. 4 is a block diagram of an exemplary client manager with a security policy for, for example, executing a plurality of instructions, in accordance with an embodiment of the invention. Referring to FIG. 4, the client manager 502 may comprise suitable circuitry, logic, and/or code and may be adapted to determine and store access rules 504 for executing a plurality of instructions stored within one or more instruction regions of an on-chip memory, such as the on-chip memory 102 in FIG. 1. The access rules 504 may comprise a list of the memory clients that may be managed by the client manager 502. For example, the memory access rules 504 may comprise a list of N memory clients 506, ..., 510. Furthermore, the memory access rules 504 may comprise a plurality of instruction list entries 512, ..., 516, corresponding to the N memory clients 506, ..., 510. Each instruction list entry may comprise a list of instructions stored within an instruction region of the on-chip memory that may be executed within the on-chip memory by a corresponding memory client entry.

For example, memory client entry 508 may comprise memory client 2. Corresponding instruction list entry 514 may comprise one or more instructions stored within an instruction region in an on-chip memory, which may be executed within the on-chip memory-by-memory client 2. The client manager 502 may communicate with one or more client verifiers or command verifiers and perform a remedial action if the verifiers detect an unauthorized memory access attempt to an instruction region. In this regard, if a verifier detects an unauthorized memory access attempt to an instruction region, the verifier may communicate an interrupt 503 to the client manager 502. In response to the interrupt 503, the client manager 502 may generate instructions 518, 520 and/or 522 and perform a remedial action based on the generated instructions.

In one embodiment of the invention, the instruction 518 may be utilized to disable a violating memory client and/or to disable the on-chip memory that a violating memory client may be trying to access. In another embodiment of the invention, the instruction 520 may be utilized to disable a multiple client system utilizing the client manager 502. In other embodiments of the invention, the instruction 522 may be utilized to re-initialize one or more instruction regions within an on-chip memory, which a violating memory client has attempted to access.

Figure 5:
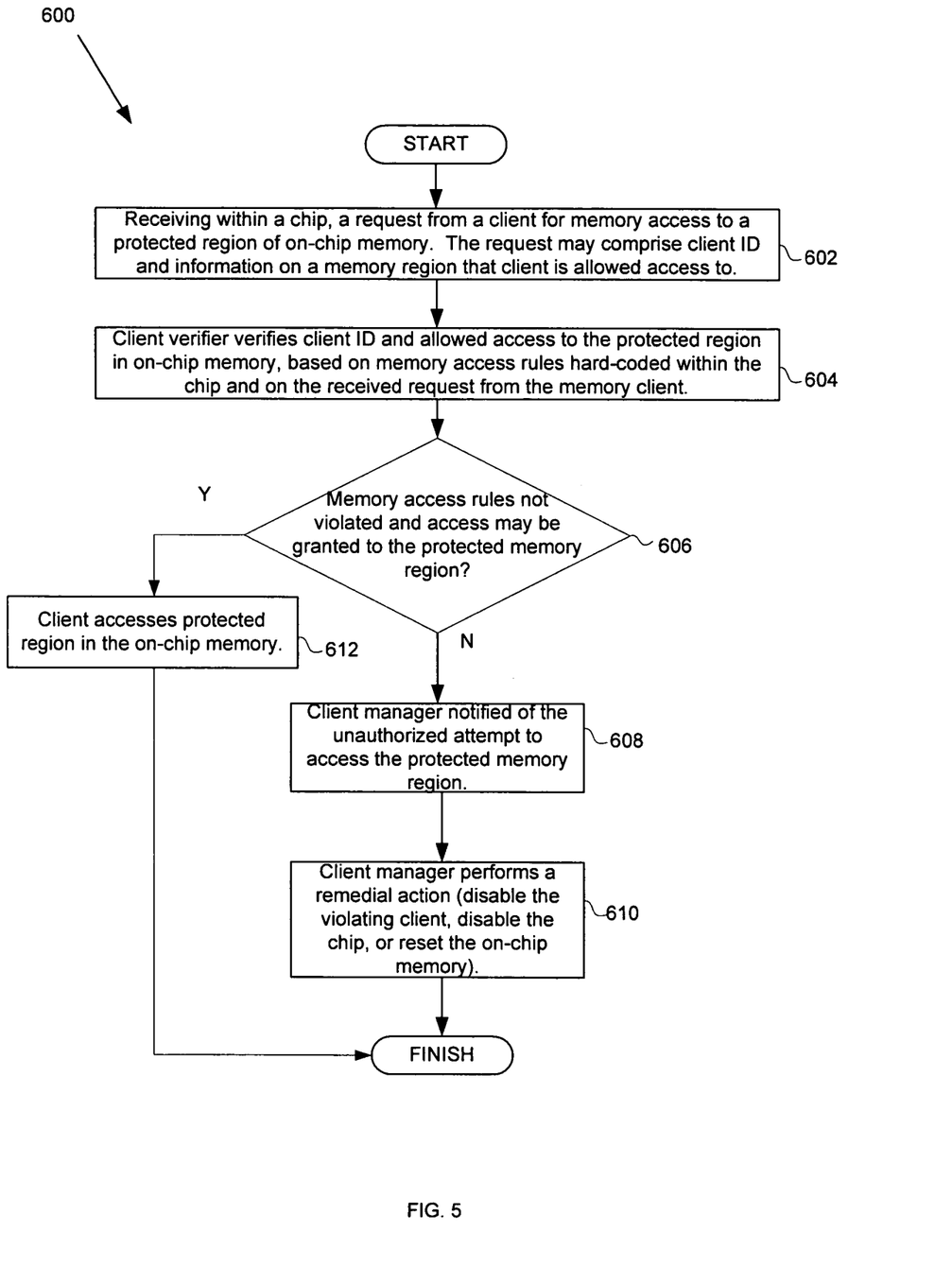
FIG. 5 is a flow diagram illustrating exemplary steps for securely handling processing of information, in accordance with an embodiment of the invention.

FIG. 5 is a flow diagram illustrating exemplary steps for securely handling processing of information, in accordance with an embodiment of the invention. Referring to FIGS. 1 and 5, at 602, a request from a memory client, such as the decode processor 118, for memory access to a protected region 104 of on-chip memory 102 may be received within a chip. The request from the decode processor 118 may comprise client ID information and address information on one or more memory region that the decode processor 118 is allowed access to. At 604, the client verifier 110 may verify the client ID information and whether the decode processor 118 may be allowed access to the protected region 104 in the on-chip memory 102, based on memory access rules that may be hard-coded within the chip and on the received request from the decode processor 118.

The memory access rules may be hard-coded within the client manager 112. At 606, it may be determined whether the memory access rules are not violated and whether access may be granted to the protected memory region 104. If the memory access rules are not violated, at 612, the decode processor 118 may access the protected region 104 in the on-chip memory 102. If the memory access rules are violated, at 608, the client verifier 110 may notify the client manager 112 of the unauthorized attempt to access the protected memory region 104. At 610, the client manager 112 may perform a remedial action. The remedial action may comprise disabling a violating memory client and/or disabling the on-chip memory 102 that a violating memory client may be trying to access. In another embodiment of the invention, the remedial action may comprise disabling a multiple client system 100 utilizing the client manager 112. In yet another embodiment of the invention, the remedial action may comprise re-initializing the protected memory region 104 within the on-chip memory 102.

In another embodiment of the invention, access to at least one portion of an on-chip memory 102 coupled to the chip by a plurality of on-chip clients that have pre-determined access to the at least one portion of the on-chip memory 102 may be controlled within a chip. The pre-determined access may be governed by pre-determined access rules that may be hard-coded within the chip. At least a portion of the on-chip memory 102 may be accessed by at least one of the plurality of on-chip clients. The at least a portion of the on-chip memory 102 may be accessible by at least another one of the plurality of on-chip clients. The pre-determined access rules may comprise at least one address range within the on-chip memory 102 corresponding to at least one of the plurality of on-chip clients, as further explained with regard to FIG. 3.

For example, the pre-determined access rules may comprise a list of memory clients and corresponding address region entries. Each address region entry corresponding to a memory client may comprise one or more data regions partitioned within an on-chip memory, which may be accessed by the memory client. One or more memory region partitions corresponding to different memory clients may be overlapping. In this regard, two memory clients, for example, may have access to the same memory region within the on-chip memory.

An access request may be received within the chip from at least one of the plurality of on-chip clients, for accessing at least a portion of the on-chip memory 102. The access request may comprise identification information for the at least one of the plurality of on-chip clients and/or an address range for accessing the on-chip memory. Access by one or more of the plurality of on-chip clients to the at least the portion of the on-chip memory 102 may be denied, if the access request violates at least one of the pre-determined access rules. The chip may be reset, if the access request violates at least one of the pre-determined access rules. Access by one or more of the plurality of on-chip clients to the at least the portion of the on-chip memory may be granted, if the access request complies with the pre-determined access rules.

A notification of the violation may be communicated to an on-chip device and/or to an off-chip device, if the access request violates at least one of the pre-determined access rules. In response to the notification of the violation, a remedial action may be performed within the chip. The remedial action may comprise disabling the at least one of the plurality of on-chip clients, disabling the plurality of on-chip clients, and/or initializing the at least the portion of the on-chip memory 102. The access to the at least one portion of the on-chip memory 102 may comprise data read access, data write access, and/or instruction execution access.

Another embodiment of the invention may provide a machine-readable storage having stored thereon, a computer program having at least one code section for securely handling processing of information, the at least one code section being executable by a machine for causing the machine to perform steps as disclosed herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for securely handling processing of information, the method comprising: controlling from within a chip, access to at least one portion of an on-chip memory by a plurality of on-chip clients that have pre-determined access to said at least one portion of said on-chip memory, wherein said pre-determined access is governed by pre-determined access rules which are hard-coded within said chip.

2. The method according to claim 1, comprising accessing by at least one of said plurality of on-chip clients, at least a portion of said on-chip memory, wherein said at least a portion of said on-chip memory is accessible by at least another one of said plurality of on-chip clients.

3. The method according to claim 1, wherein said pre-determined access rules comprise at least one address range within said on-chip memory corresponding to at least one of said plurality of on-chip clients.

4. The method according to claim 1, comprising receiving within said chip, an access request from at least one of said plurality of on-chip clients, for accessing at least a portion of said on-chip memory.

5. The method according to claim 4, wherein said access request comprises one or both of identification information for said at least one of said plurality of on-chip clients and/or an address range for accessing said on-chip memory.

6. The method according to claim 4, comprising, if said access request violates at least one of said pre-determined access rules, denying access by said at least one of said plurality of on-chip clients to said at least said portion of said on-chip memory.

7. The method according to claim 4, comprising, if said access request complies with said pre-determined access rules, granting access by said at least one of said plurality of on-chip clients to said at least said portion of said on-chip memory.

8. The method according to claim 4, comprising, if said access request violates at least one of said pre-determined access rules, communicating a notification of said violation to one or both of an on-chip device and/or an off-chip device.

9. The method according to claim 4, comprising, if said access request violates at least one of said pre-determined access rules, collecting information for determining a cause of the violation.

10. The method according to claim 1, wherein said access to said at least one portion of said on-chip memory comprises one or more of data read access, data write access, and/or instruction execution access.

11. A system for securely handling processing of information, the system comprising: circuitry that enables from within a chip, access to at least one portion of an on-chip memory by a plurality of on-chip clients that have pre-determined access to said at least one portion of said on-chip memory, wherein said pre-determined access is governed by pre-determined access rules which are hard-coded within said chip.

12. The system according to claim 11, wherein at least one of said plurality of on-chip clients accesses at least a portion of said on-chip memory, and wherein said at least a portion of said on-chip memory is accessible by at least another one of said plurality of on-chip clients.

13. The system according to claim 11, wherein said pre-determined access rules comprise at least one address range within said on-chip memory corresponding to at least one of said plurality of on-chip clients.

14. The system according to claim 11, wherein said circuitry enables within said chip, reception of an access request from at least one of said plurality of on-chip clients, for accessing at least a portion of said on-chip memory.

15. The system according to claim 14, wherein said access request comprises one or both of identification information for said at least one of said plurality of on-chip clients and/or an address range for accessing said on-chip memory.

16. The system according to claim 14, wherein said circuitry enables denial of access by said at least one of said plurality of on-chip clients to said at least said portion of said on-chip memory, if said access request violates at least one of said pre-determined access rules.

17. The system according to claim 14, wherein said circuitry enables granting of access by said at least one of said plurality of on-chip clients to said at least said portion of said on-chip memory, if said access request complies with said pre-determined access rules.

18. The system according to claim 14, wherein said circuitry enables communication of a notification of said violation to one or both of an on-chip device and/or an off-chip device, if said access request violates at least one of said pre-determined access rules.

19. The system according to claim 14, wherein said circuitry enables collection of information for determining a cause of the violation, if said access request violates at least one of said pre-determined access rules.

20. The system according to claim 11, wherein said access to said at least one portion of said on-chip memory comprises one or more of data read access, data write access, and/or instruction execution access.

21. A method for securely handling processing of information, the method comprising:
controlling from within a chip, access to at least one portion of an on-chip memory by a plurality of on-chip clients that have pre-determined access to said at least one portion of said on-chip memory, wherein said pre-determined access is governed by pre-determined access rules which are hard-coded within said chip;
receiving within said chip, an access request from at least one of said plurality of on-chip clients, for accessing at least a portion of said on-chip memory; and
resetting said chip, if said access request violates at least one of said pre-determined access rules.

22. A method for securely handling processing of information, the method comprising:
controlling from within a chip, access to at least one portion of an on-chip memory by a plurality of on-chip clients that have pre-determined access to said at least one portion of said on-chip memory, wherein said pre-determined access is governed by pre-determined access rules which are hard-coded within said chip;
receiving within said chip, an access request from at least one of said plurality of on-chip clients, for accessing at least a portion of said on-chip memory;
communicating a notification of said violation to one or both of an on-chip device and/or an off-chip device, if said access request violates at least one of said pre-determined access rules; and
in response to said notification of said violation, performing one or more of disable said at least one of said plurality of on-chip clients, disable said plurality of on-chip clients, and/or initialize said at least said portion of said on-chip memory.

23. A method for securely handling processing of information, the method comprising:
controlling from within a chip, access to at least one portion of an on-chip memory by a plurality of on-chip clients that have pre-determined access to said at least one portion of said on-chip memory, wherein said pre-determined access is governed by pre-determined access rules which are hard-coded within said chip;
receiving within said chip, an access request from at least one of said plurality of on-chip clients, for accessing at least a portion of said on-chip memory;
collecting information for determining a cause of the violation, if said access request violates at least one of said pre-determined access rules; and
storing said collected information in a non-resettable memory.

24. The method according to claim 23, comprising:
blocking indirect memory access to external memory by said plurality of on-chip clients.

25. A system for securely handling processing of information, the system comprising:
circuitry that enables from within a chip, access to at least one portion of an on-chip memory by a plurality of on-chip clients that have pre-determined access to said at least one portion of said on-chip memory, wherein said pre-determined access is governed by pre-determined access rules which are hard-coded within said chip,
wherein said circuitry enables within said chip, reception of an access request from at least one of said plurality of on-chip clients, for accessing at least a portion of said on-chip memory, and
wherein said circuitry enables reset of said chip, if said access request violates at least one of said pre-determined access rules.

26. A system for securely handling processing of information, the system comprising:
circuitry that enables from within a chip, access to at least one portion of an on-chip memory by a plurality of on-chip clients that have pre-determined access to said at least one portion of said on-chip memory, wherein said pre-determined access is governed by pre-determined access rules which are hard-coded within said chip,
wherein said circuitry enables within said chip, reception of an access request from at least one of said plurality of on-chip clients, for accessing at least a portion of said on-chip memory,
wherein said circuitry enables communication of a notification of said violation to one or both of an on-chip device and/or an off-chip device, if said access request violates at least one of said pre-determined access rules, and
wherein said circuitry enables one or more of deactivation of said at least one of said plurality of on-chip clients, deactivation of said plurality of on-chip clients, and/or initialization of said at least said portion of said on-chip memory, in response to said notification of said violation.

27. A system for securely handling processing of information, the system comprising:
circuitry that enables from within a chip, access to at least one portion of an on-chip memory by a plurality of on-chip clients that have pre-determined access to said at least one portion of said on-chip memory, wherein said pre-determined access is governed by pre-determined access rules which are hard-coded within said chip,
wherein said circuitry enables within said chip, reception of an access request from at least one of said plurality of on-chip clients, for accessing at least a portion of said on-chip memory,
wherein said circuitry enables collection of information for determining a cause of the violation, if said access request violates at least one of said pre-determined access rules, and
wherein said circuitry enables storing of said collected information in a non-resettable memory.

28. The system according to claim 27, wherein said circuitry enables blocking of indirect memory access to external memory by said plurality of on-chip clients.

* * * * *